Feb. 16, 1932.  H. A. ROHRICH  1,845,626
GLASSWARE FORMING MACHINE
Filed Oct. 13, 1928  4 Sheets-Sheet 1
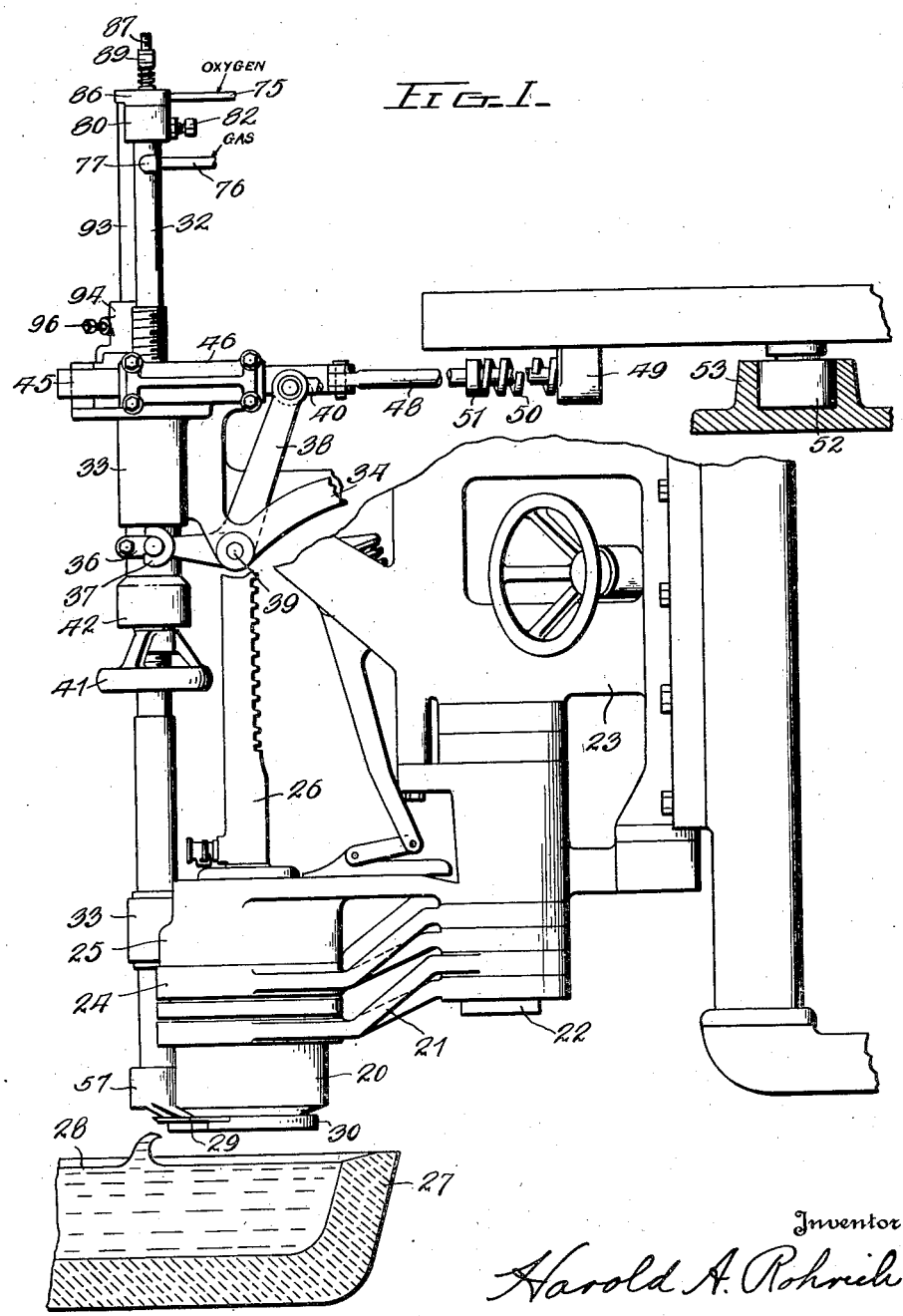

Feb. 16, 1932.  H. A. ROHRICH  1,845,626
GLASSWARE FORMING MACHINE
Filed Oct. 13, 1928  4 Sheets-Sheet 2
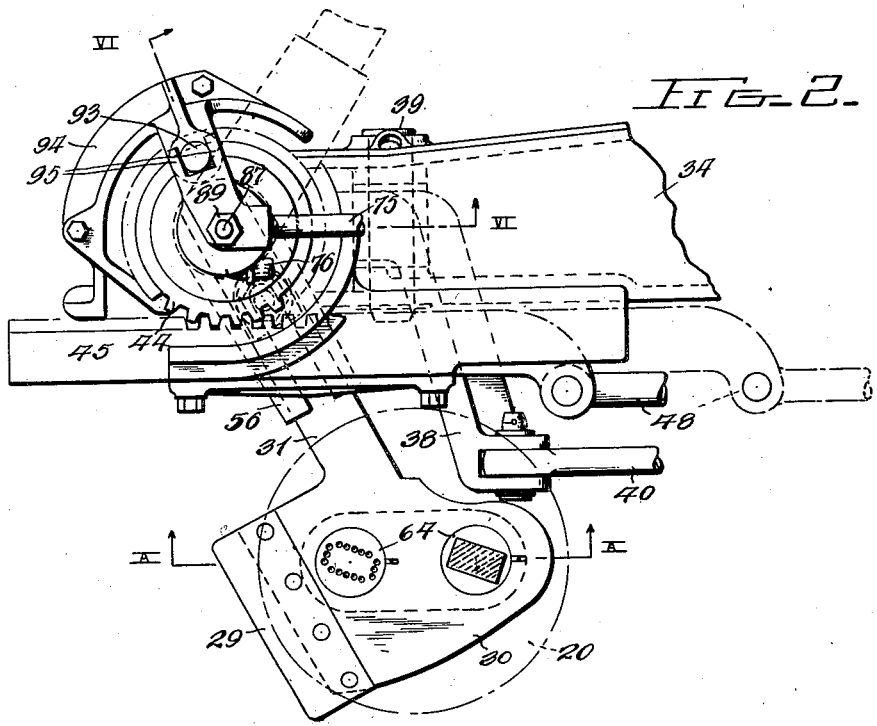
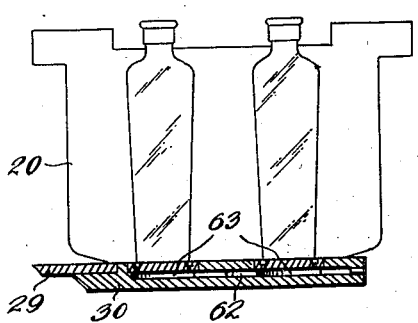
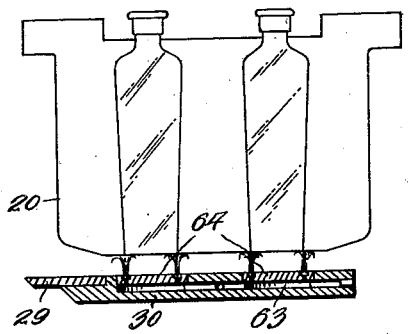
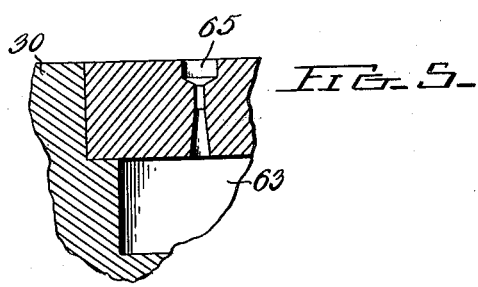
Inventor
Harold A. Rohrich
By J. F. Rule
Attorney

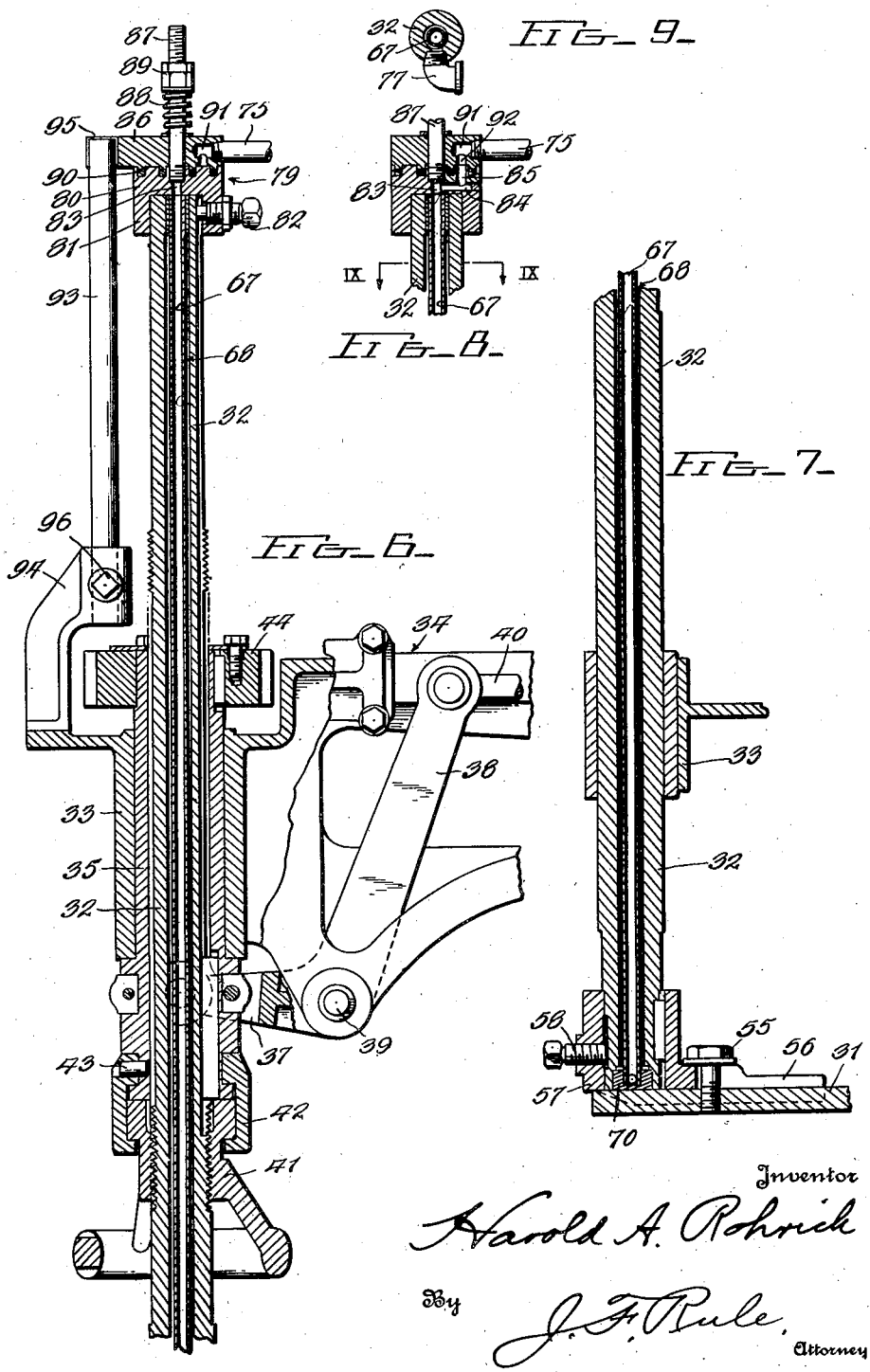

Feb. 16, 1932.  H. A. ROHRICH  1,845,626
GLASSWARE FORMING MACHINE
Filed Oct. 13, 1928  4 Sheets-Sheet 4
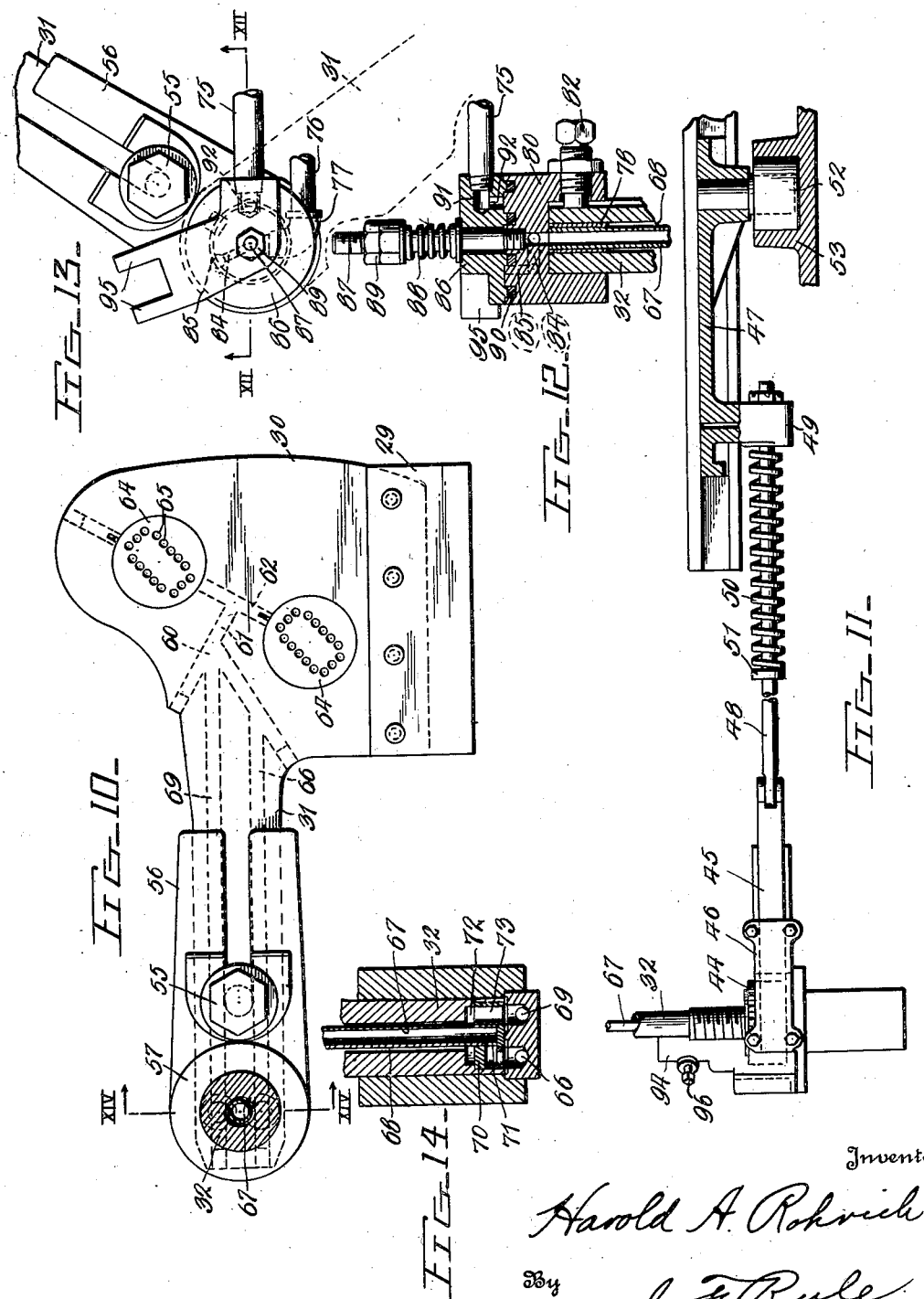
Inventor
Harold A. Rohrich
By J. F. Rule
Attorney

Patented Feb. 16, 1932

1,845,626

UNITED STATES PATENT OFFICE

HAROLD A. ROHRICH, OF TOLEDO, OHIO, ASSIGNOR TO OWENS-ILLINOIS GLASS COMPANY, OF TOLEDO, OHIO, A CORPORATION OF OHIO

GLASSWARE FORMING MACHINE

Application filed October 13, 1928. Serial No. 312,264.

The present invention relates to improvements in glass forming machines and more particularly to means for preventing the formation of scars and other defects on the bottoms of bottles and similar containers due to chilling of the glass at the time the mold charges are severed from the supply body of molten glass.

In Patent 1,534,036 to Stenhouse et al., dated April 21, 1925, there is disclosed an apparatus embodying the broad principle of blank heating involved in the present application. Reference may be had to this patent for certain details of construction and operation which are common to glassware blowing machines in general embodying cut-off knives and intended for use with the present invention.

A feature of the present invention consists in providing a burner which will supply a heating flame to the bottom of the mold and to the severed charge of glass while the latter is still enclosed in the mold. The burner is preferably constructed to apply a localized flame to the margin or edge of the mold opening and of the parison of glass therein. In this manner, the edge or margin of the lower end of the parison of glass, which portion ordinarily becomes unduly chilled and produces the usual cut-off scar—is heated and melted down so as to produce a smooth surface. At the same time, the edge of the mold itself is heated to a degree to avoid the usual chilling of the glass, thus preventing the formation of cold ragged edges, fins, or other conditions which cause defects in the finished ware.

Another object of the present invention is to provide novel and effective means to supply fuel to burners embodied in the knife holder structure, said means being such that the intense heat to which the parts are subjected will not interfere with proper operation of the apparatus. To this end the invention includes the provision of fuel passageways extending lengthwise of and entirely within the knife-carrying rock shaft, thereby avoiding the necessity for using flexible pipes which do not readily stand up under the intense heat.

Another object is to provide an automatic valve actuated by the rocking movement of the knife-carrying shaft to control the flow of fuel to the burners in the knife holder.

A further object is to provide simplified and improved means to apply heat to the chilled lower portions of blanks in the blank molds to thereby effectively remove or remelt chilled portions of the blanks.

Other objects will be apparent hereinafter.

In the drawings:

Fig. 1 is a fragmentary elevation showing the cut-off knife in position to close the mold cavities.

Fig. 2 is a fragmentary plan view with the cut-off knife positioned below the blank mold, the latter being shown in dotted lines.

Figs. 3 and 4 are views taken along the line A—A of Fig. 2.

Fig. 3 shows the knife holder in contact with the bottom of the mold to close the mold cavities, while Fig. 4 shows the knife holder spaced downwardly from the mold permitting the flames to play upon the bottom and marginal portions of the blanks.

Fig. 5 is a detail sectional view showing one of the jet orifices in the burner plates.

Fig. 6 is a vertical sectional view showing the knife raising and lowering means and the fuel conduit thru the knife supporting rock shaft.

Fig. 7 is a sectional view of the lower portion of the knife support.

Fig. 8 is a detail sectional view of the upper end of the knife support showing a portion of the means for controlling the flow of oxygen to the burners in the knife holder.

Fig. 9 is a sectional view taken along the line IX—IX of Fig. 8.

Fig. 10 is a plan view with parts in section showing the knife and holder and the fuel conduits leading to the burners.

Fig. 11 is a side elevation with parts in section showing the means to oscillate the cut-off knife.

Fig. 12 is a detail sectional view of the upper end of the knife support, showing the valve controlling the flow of oxygen, this view being taken along the line XII—XII of Fig. 13.

Fig. 13 is a plan view of the parts shown in Fig. 12.

Fig. 14 is a sectional view of the lower portion of the knife support taken substantially along the line XIV—XIV of Fig. 10.

In the drawings, which illustrate the preferred embodiment of the invention, the glass forming machine with which the invention is associated is of the well known Owens type embodying an annular series of suction gathering or blank molds 20 each composed of half sections connected thru arms 21 to a vertical hinge pin 22. This hinge pin 22 is suitably connected to the dipping frame 23 and carries a neck mold 24 and blowing head 25, the two latter elements adapted to cooperate with the mold 20 in the usual manner. A plunger rod 26 is arranged above said mold and blowing head and has a plunger (not shown) removably attached thereto for projection into the neck mold 24.

The foregoing elements are included in each head or mold group, of which there is an annular series rotatable about a vertical axis in a well known manner. Rotation of the heads bring them one at a time to a position over a receptacle 27 such as a revolving pot, which contains a supply body of molten glass 28 from which mold charges are gathered by suction. As each mold approaches the charge gathering position, the frame 23 is lowered to dip the bottom end of the mold into the glass. Simultaneously with contact between the mold and glass, vacuum is applied to the mold cavity so that the latter is filled with glass. The dipping frame 23 is then lifted and the cut-off knife 29 swung laterally across the lower end of the mold to sever the mold charge from the supply body. After the mold charge has been transformed into a parison the blank mold 20 is opened (by means not shown) and the bare parison suspended from the neck mold is enclosed in a finishing mold (not shown) and expanded to its final shape.

The cut-off knife 29 is fixed to one edge of a holder 30 which includes an arm 31 separably connected to the lower end of a tubular rock shaft 32 extending vertically upwardly thru vertically spaced bearings 33. This holder 30 is in the form of a plate having a flat upper face arranged in a plane with the upper side of the knife 29.

The upper bearing 33 (Figs. 1 and 6) is formed at the outer end of a bracket arm 34 included in the frame 23 and is of such internal diameter that a sleeve or tubular shaft 35 may be placed therein around an intermediate portion of the tubular rock shaft 32. The tubular shaft 35 or sleeve is keyed to the knife supporting rock shaft 32 (Fig. 6) so that said shafts rotate together and are capable of relative longitudinal movement. The lower end of the internal tubular shaft 35 is enlarged and connected thru links 36 (Fig. 1) to a yoke 37 formed on one end of a bell crank lever 38 (Figs. 1 and 6) the latter pivoted to a hinge pin 39 in the bracket arm 34 and connected thru a rod 40 to cam mechanism (not shown) which operates to rock the lever 38 at regular time intervals thereby imparting vertical movement to the sleeve 35. A hand wheel 41 is threaded upon the knife carrying rock shaft 32 (Fig. 6) and is rotatively connected thru a flanged collar 42 and lock pin 43 to the lower end of the internal sleeve or tubular shaft 35. Thus, the knife carrying rock shaft 32 may be adjusted in the direction of its length to thereby change the elevation of the knife 29 and holder 30 relative to the lower face of the corresponding blank mold 20. This adapts the knife for use with molds of different lengths and provides for adjustment of the knife for other reasons. Also, this connection between the tubular shafts or sleeves 32 and 35 provides means whereby rocking of the bell crank lever 38 and consequent lengthwise movement of the sleeve 35 imparts a corresponding movement of the knife carrying rock shaft whereby the knife 29 and knife holder 30 may be moved into and out of contact with the mold bottom in alternation.

The upper end of the sleeve 35 carries a gear or pinion 44 running in mesh with a rack bar 45, the latter arranged in a horizontal slideway 46 extending radially of the machine. The rack bar is connected to a slide 47 thru a push rod 48, the latter having one end slidingly supported in a lug 49 depending from said slide 47. A coil spring 50 encircles the rod 48 and is interposed between said depending lug 49 and a stop 51 on the rod. This spring functions as a safety device preventing breakage or severe straining of parts associated therewith in the event abnormal operating conditions arise. The slide 47 carries a cam roll 52 running in mesh with a stationary cam 53 which is shaped to reciprocate the rack bar 45 at regular time intervals.

The holder arm 31 is separably connected by a bolt 55, or similar fastener, to a bracket 56 extending laterally from a collar 57 which is keyed to the lower end of the knife supporting rock shaft 32. A set screw 58 carried by the collar 57 secures the collar and shaft together. The bracket 56 (Figs. 7 and 10) is bifurcated to provide a slot extending lengthwise of the bracket and receiving the locking screw or bolt 55.

The holder 30 for the cut-off knife (Figs. 3, 4, 5 and 10) is formed with a manifold 60 or mixing chamber leading thru a short passageway 61 to a conduit 62 whose opposite ends communicate with chambers 63. These chambers may be of any preferred outline and are formed with shoulders upon which burner plates 64 rest. These burner plates 64 have their upper faces arranged in a plane with the upper surface of the holder 30 and each is formed with a series of small jets 65 thru which the fuel to be burned is ejected. These series of jets are arranged in different outlines each depending upon the shape of the cross section or bottom margin of the blank to which heat is to be applied. Thus if, as shown in Figs. 2 and 3, the blank is rectangular in cross-section the series of jets 65 will likewise be arranged to present a rectangular outline. This jet arrangement as will be hereinafter apparent is provided so that the heat will be applied directly to those portions (generally the marginal portions) of the blanks most seriously affected by the chilling action of the knife 29 and parts closely associated therewith.

The manifold 60 or mixing chamber is connected to a pair of spaced conduits extending lengthwise of the holder arm 31, one conduit 66 communicating at one end with a conduit 67 which supplies oxygen to the burners. This conduit 67 is formed of a length of pipe of less external diameter than the internal diameter of the knife-carrying rock shaft 32 and is arranged within said rock shaft, thereby providing an annular passageway 68 thru which fuel gas may be constantly supplied to the other conduit 69 extending thru the holder arm 31 to the manifold 60 or mixing chamber. The lower end of the oxygen pipe 67 (Figs. 7 and 14) is set into a block 70 formed with a substantially L-shaped passageway 71 which provides communication between the interior of the pipe and the conduit 66 extending thru the holder arm 31 to the mixing chamber or manifold. The annular passageway 68 opens at its lower end into an annular chamber 72 and communicates with the conduit 69 thru a port 73 in the block 70. Thus the fuel gas and oxygen do not intermingle prior to reaching the mixing chamber or manifold in the knife-holder 30.

The oxygen pipe 67 and the knife-carrying rock shaft 32 are co-extensive at their upper ends and communicate at these ends with oxygen and fuel gas supply pipes 75 and 76 respectively. The gas supply pipe 76 is connected thru an elbow 77 (Figs. 1 and 13) to the gas conduit 68 which extends lengthwise of the rock shaft 32 between the latter and the oxygen pipe 67. A packing ring 78 (Fig. 12) encircles the upper end of the oxygen pipe 67 and closes the upper end of the gas conduit 68.

The flow of oxygen to the pipe 67 and thence to the burners in the knife holder 30 is controlled by an automatic valve 79 provided at the upper end of the knife supporting rock shaft 32, said valve 79 being operated by rotary movement of the rock shaft as will be apparent presently. This valve 79 includes a circular head 80 formed with a depending annular flange 81 which fits over the upper end of the rock shaft 32 and is secured thereto by a lock screw 82 or similar fastening device. The head 80 is formed with an axial opening 83 (Figs. 6 and 8) communicating with a radial passageway 84 which opens thru the upper face of the circular head 80 by way of a port 85. This head 80 oscillates with the rock shaft 32 thereby moving the port 85 along an arcuate path to thereby alternately open and close the valve as will be apparent.

A non-rotating disk 86 contacts with the upper side of the head 80 and is connected to the latter by a rod 87 (Fig. 6) extending thru an axial opening in said disk and having its lower end threaded into the upper portion of the axial opening 83 in the head 80. A coil spring 88 encircles the connecting rod 87 between the disk 86 and stop nuts 89 whereby the disk 86 and head 80 are held in snug engagement with each other. Packing rings 90 are arranged between the meeting faces of the disk 86 and head 80 to prevent leakage of oxygen being supplied by the pipe 75 to the oxygen pipe 67 extending thru the rock shaft 32. The supply pipe 75 communicates thru a radial opening 91 with a downwardly opening port 92 which at regular time intervals registers with the port 85 as a result of rotary movement of the rock shaft 32 and head 80. A rod 93 rising from a bracket 94 (Figs. 2 and 6) extends between a pair of fingers 95 on the disk 86 to assist in preventing rotation of the latter with the circular head 80. This rod 93 is adjustable vertically in the supporting bracket 94 thereby permitting the rod to perform its function irrespective of the elevation at which the valve 79 is positioned. A set screw 96 locks the rod in its different adjusted positions.

In operation, the gathering molds 20 are continuously moved in a closed path bringing them one at a time to a position over the revolving tank 27 which contains the bath of molten glass 28 from which the mold charges are gathered by suction. Each mold is dipped into the glass and gathers its charge or charges. In the present application the gathering mold is formed with two cavities each substantially rectangular in cross section. As the mold is lifted away from the glass the cam 53 operates thru the slide 47, push rod 48 and rack and pinion 45 and 44 respectively, to oscillate the knife supporting shaft 32 and thereby swing the knife and its holder across the bottom face of the mold. Such movement of the knife severs the charges of glass in the mold cavities from the supply body in the tank or pot 27 and finally brings the holder 30 to the position shown in Figs. 2 and 3. During this entire charge gathering and severing operation small flames have been issuing from the burners in the knife holder 30, these flames resulting from burning of raw gas which is constantly flowing thru the conduit 68. When the knife reaches the limit of its working stroke, the knife supporting rock shaft 32 will have been so positioned that the ports 85 and 92 in the automatic valve 79 register with each other and thereby provide communication between the oxygen supply pipe 75 and the pipe 67 extending downwardly thru the rock shaft 32. The oxygen flows thru its individual conduit to the mixing chamber 60 in the knife holder 30 where it is mixed with the fuel gas and delivered to the burners in the holder. This provides intense flames which are played upon the lower marginal portions of the blank while the latter are still enclosed in the mold 20. Obviously, the heat may also be applied after the mold opens, if desired. Substantially simultaneously with addition of the oxygen to the gas, the rock shaft 32 is moved axially downward by rocking of the bell crank lever 38 to thereby space the holder 30 from the mold as shown in Fig. 4. Thus the effectiveness of the upwardly projected flames is materially increased. As previously stated the series of jet orifices 65 in each burner plate may be arranged in any number of different outlines depending upon the cross sectional shape of the blank to be heat treated. At a predetermined station the cam 53 operates thru the connections above described to impart rotary movement to the rock shaft 32 in a direction to position the knife at one side of the corresponding blank mold 20 so that the latter may be opened in the usual manner to permit transfer of the blank or blanks to a finishing mold (not shown) in which the blanks are expanded to their final shape just prior to discharge from the forming machine. Movement of the knife to one side of the blank mold rocks the shaft 32 and cuts off the supply of oxygen to the burners. The fuel gas continues to flow and provides a low flame.

The structure above described provides effective and reliable means to supply fuel to the burners in the knife holder 30, and in such that the intense heat to which the mechanism is subjected, will not interfere with proper operation of the mechanism. By forming the fuel gas and oxygen conduits entirely within the knife-carrying rock shaft 32 and knife holder the necessity for providing flexible pipe connections or similar more or less unreliable conduits leading to the burners, is entirely avoided.

Modifications may be resorted to within the spirit and scope of the appended claims.

What I claim is:

1. In combination, a suction gathering mold, a cut-off knife, a holder for the knife, a burner on the upper side of said holder, a rock shaft supporting the holder and knife, means to oscillate the rock shaft and thereby periodically move the knife and holder into operative relation to the mold, and means including conduits extending thru the rock shaft to supply fuel to the burner.

2. In combination, a suction gathering mold, a cut-off knife, a holder for the knife, a burner on the upper side of said holder, a rock shaft supporting the holder and knife, means to oscillate the rock shaft and thereby periodically move the knife and holder into operative relation to the mold, means including conduits extending thru the rock shaft to supply fuel to the burner, and a valve actuated by oscillation of the rock shaft to control the flow of fuel thru the conduits to the burner.

3. In combination, a suction gathering mold, a cut-off knife, a holder for the knife, a burner on the upper side of said holder, a rock shaft supporting the holder and knife, means to oscillate the rock shaft and thereby periodically move the knife and holder into operative relation to the mold, means including conduits extending thru the rock shaft to supply fuel to the burner, a valve to control the supply of fuel to the burner including a head fixed to the upper end of the rock shaft and adapted to oscillate with the latter, said head having a passageway communicating at one end with one of the conduits thru the rock shaft and opening by way of a port at its other end thru the upper face of said head, and a fixed member arranged over said head and having a fuel inlet port and an outlet port, the latter opening downwardly and adapted at times to register with the port in said head.

4. In combination, a cut-off knife, a holder for said knife adapted to close one end of a mold cavity at regular time intervals, a burner in the upper face of said holder, a tubular rock shaft supporting the holder and knife, a pipe extending lengthwise of and within the rock shaft and of less external diameter than the internal diameter of the rock shaft to thereby provide a pair of fuel conduits extending lengthwise of the shaft, means including separate passageways to convey fuel from the conduits to the burner, and means to supply fuel to said conduits.

5. In combination, a cut-off knife, a holder for said knife adapted to close one end of a mold cavity at regular time intervals, a burner in the upper face of said holder, a tubular rock shaft supporting the holder and knife, a pipe extending lengthwise of and within the rock shaft and of less external diameter than the internal diameter of the rock shaft to thereby provide a pair of fuel conduits extending lengthwise of the shaft, means including separate passageways to convey fuel from the conduits to the burner, means to constantly supply fuel gas to one of the conduits, and means to supply oxygen to the other conduit intermittently.

6. In combination, a cut-off knife, a holder for said knife adapted to close one end of a mold cavity at regular time intervals, a burner in the upper face of said holder, a tubular rock shaft supporting the holder and knife, a pipe extending lengthwise of and within the rock shaft and of less external diameter than the internal diameter of the rock shaft to thereby provide a pair of fuel conduits extending lengthwise of the shaft, means including separate passageways to convey fuel from the conduits to the burner, means to constantly supply fuel gas to one of the conduits, means to supply oxygen to the other conduit intermittently, and means to mix the fuel gas and oxygen just prior to reaching the burner.

7. In combination, a cut-off knife, a holder for said knife adapted to close one end of a mold cavity at regular time intervals, a burner in the upper face of said holder, a tubular rock shaft supporting the holder and knife, a pipe extending lengthwise of and within the rock shaft and of less external diameter than the internal diameter of the rock shaft to thereby provide a pair of fuel conduits extending lengthwise of the shaft, means including separate passageways to convey fuel from the conduits to the burner, means to supply fuel to said conduits, means to oscillate the rock shaft, and valve mechanism actuated by oscillation of the rock shaft to control the supply of fuel to one of said conduits.

8. In combination, a cut-off knife, a holder for the cut-off knife including a plate having a flat upper face, a rock arm extending laterally from the holder, a rock shaft carrying said arm, a pair of fuel conduits extending lengthwise thru the arm to the rock shaft and lengthwise through the rock shaft, a mixing chamber in the holder communicating with both conduits, a burner formed in the upper face of said holder, and means to convey the mixed fuel from the mixing chamber to the burner.

Signed at Toledo, Ohio, this 12th day of October, 1928.

HAROLD A. ROHRICH.